(12) United States Patent
Pacary et al.

(10) Patent No.: US 9,181,108 B2
(45) Date of Patent: Nov. 10, 2015

(54) METHOD FOR DECONTAMINATION OF A LIQUID EFFLUENT INCLUDING ONE OR MORE RADIOACTIVE CHEMICAL ELEMENTS BY TREATMENT IN A FLUIDIZED BED

(75) Inventors: Vincent Pacary, Bagnols sur Ceze (FR); Yves Barre, Uchaux (FR); Edouard Plasari, Nancy (FR); Olivier Cohin, Nancy (FR); Hervé Muhr, Champigneulles (FR); Claire Jaubert Cere, Bagnols sur Ceze (FR)

(73) Assignee: Commissariat à l' énergie atomique et aux énergies alternatives, Paris (FR)

( * ) Notice: Subject to any disclaimer, the term of this patent is extended or adjusted under 35 U.S.C. 154(b) by 850 days.

(21) Appl. No.: 13/125,965

(22) PCT Filed: Oct. 26, 2009

(86) PCT No.: PCT/EP2009/064093
§ 371 (c)(1),
(2), (4) Date: Aug. 15, 2011

(87) PCT Pub. No.: WO2010/049396
PCT Pub. Date: May 6, 2010

(65) Prior Publication Data
US 2011/0290732 A1 Dec. 1, 2011

(30) Foreign Application Priority Data
Oct. 27, 2008 (FR) ...................................... 08 57288

(51) Int. Cl.
*C02F 1/42* (2006.01)
*C02F 1/28* (2006.01)
(Continued)

(52) U.S. Cl.
CPC . *C02F 1/283* (2013.01); *G21F 9/10* (2013.01); *G21F 9/12* (2013.01); *C02F 1/34* (2013.01); *C02F 1/42* (2013.01); *C02F 1/56* (2013.01); *C02F 2101/006* (2013.01)

(58) Field of Classification Search
USPC ......... 210/264, 265, 912, 702, 714, 715, 716, 210/717, 723, 749, 767, 661, 663, 669, 688, 210/800, 804, 807; 423/155, 157–160
See application file for complete search history.

(56) References Cited

U.S. PATENT DOCUMENTS 2,276,300 A * 3/1942 Green ........................... 210/206
3,330,771 A * 7/1967 Komatsu ................... G21F 9/10
210/723

(Continued)

FOREIGN PATENT DOCUMENTS

CN 101219366 A1 * 7/2008
DE 19642839 4/1998

(Continued)

OTHER PUBLICATIONS

Feng, X., et al., "The hydrodynamic behavior of the liquid-solid circulating fluidized bed ion exchange system for cesium removal," Powder Technology, 134 (2003), p. 235-242.*

(Continued)

*Primary Examiner* — Chester Barry
(74) *Attorney, Agent, or Firm* — Knobbe Martens Olson & Bear, LLP

(57) ABSTRACT

A method for decontamination of a liquid effluent including one or more radioactive chemical elements to be eliminated is disclosed. According to one aspect, the method includes The method includes mixing, in a first zone of a reactor, solid particles with the liquid which are able, by co-precipitation, adsorption and/or ion exchange, to capture and retain the radioactive chemical elements. The solid particles settle in a second zone of the reactor. The solids, including the radioactive chemical elements, are then separated from the remaining liquid.

12 Claims, 2 Drawing Sheets

(51) Int. Cl.
*G21F 9/10* (2006.01)
*G21F 9/12* (2006.01)
*C02F 1/34* (2006.01)
*C02F 1/56* (2006.01)
*C02F 101/00* (2006.01)

(56) References Cited

U.S. PATENT DOCUMENTS 3,488,162 A * 1/1970 Sierzputowski ............... 423/20
3,497,325 A * 2/1970 Cameron et al. ............ 422/228
4,347,141 A   8/1982 Rothberg
5,789,640 A * 8/1998 Jin et al. ........................ 585/467
6,419,832 B1  7/2002 Van De Steeg et al.
6,716,344 B1 * 4/2004 Bassi et al. .................... 210/189

FOREIGN PATENT DOCUMENTS

DE    19927907    1/2001
EP    0646934     4/1995

OTHER PUBLICATIONS

Preliminary Search Report for FR 0857288, dated Jun. 4, 2009.
International Preliminary Report on Patentability for PCT/EP2009/064093, received Jun. 3, 2011.
International Search Report and Written Opinion dated Oct. 26, 2009 for PCT Application No. PCT/EP2009/064093.

* cited by examiner

METHOD FOR DECONTAMINATION OF A LIQUID EFFLUENT INCLUDING ONE OR MORE RADIOACTIVE CHEMICAL ELEMENTS BY TREATMENT IN A FLUIDIZED BED

BACKGROUND

The present invention relates to a method for decontamination of a liquid effluent including one or more radioactive elements to be eliminated (such as strontium, ruthenium, caesium, the α emitters, such as americium, plutonium and uranium), by treatment in a fluidised bed, for example by coprecipitation.

The decontamination treatment of liquid effluents, notably radioactive liquid effluents, by coprecipitation was developed in the 1960s. It consists of introducing into the liquid element to be decontaminated preformed solid particles and/or precursor reagents of the said particles, where the said reagents react in situ in the liquid element to be decontaminated to form the said particles. These particles are chosen for their capacity to capture and retain selectively the said chemical element or elements to be eliminated. Among the solid particles capable of capturing and retaining metal elements, one may cite:

barium sulphate particles, able to capture and retain strontium;

iron and copper hydroxide particles, able to capture and retain ruthenium and the a emitters, such as americium, plutonium and uranium;

nickel and cobalt ferrocyanide particles, able to capture and selectively retain caesium.

The decontamination treatment can be accomplished in two modes:

a discontinuous mode, in which only a predetermined volume of liquid effluent to be decontaminated introduced into a reactor is treated, in which the solid particles able to capture and retain the said chemical element or elements to be eliminated, and/or the precursor reagents of the said particles, are introduced;

a continuous mode, in which the effluent to be decontaminated, the solid particles able to capture and retain the said chemical elements to be eliminated and/or the precursor reagents of the said particles are introduced into a reactor in a continuous manner, at a constant or variable rate of flow, where the addition of the particles and/or reagents can be accomplished in a cascade of reactors.

Whether with the discontinuous or continuous mode, it is obtained on conclusion of the treatment in the reactor, a suspension of solid particles, having captured the chemical elements to be eliminated initially present in the liquid effluent. The final outcome of the treatment consists, after this, in undertaking a step of liquid/solid separation, generally in a settling tank. This step can be facilitated by adding a coagulating agent and/or a flocculating agent to the suspension. The solid phase obtained at the outcome of this separation step (called at this stage a "sludge"), is then considered as a final waste product, and is conditioned, generally in bitumen or in a cement matrix, before being stored. The decontaminated liquid, for its part, is discharged into the environment, if its radiological and chemical composition permits this. Failing this, the liquid can be subject to another decontamination process.

To implement such a decontamination method two devices are traditionally required:

a reactor (which may include one or more tanks), in which the step of bringing the solid particles able to precipitate into contact with the chemical elements to be eliminated from the liquid effluent is accomplished; and a settling tank and/or a filtration module allowing the solid-liquid separation, i.e. between the phase including the precipitate having captured the chemical element(s) to be eliminated and the liquid phase including the eliminated effluent or, at least, which has had its content of the chemical element(s) to be eliminated reduced, where the settling requires the use of organic compounds, such as flocculating agents, in order to facilitate the consolidation of the particles in the suspension.

This type of treatment therefore requires an installation of substantial size, and which is also therefore inflexible. Moreover, the investment required for the construction, operation and maintenance of this type of installation is substantial.

Furthermore, notably when the treatment is undertaken in discontinuous mode, in order that the various steps of the treatment are able to be undertaken (filling of the tank, addition of the reagents, mixing, draining, etc.), the time required to undertake them is substantial (of the order, for example, of several hours), thereby restricting the installation's treatment capacity.

When the treatment is accomplished in continuous mode, in order to have an effective treatment, it is necessary that the effluent is able to stay for a substantial time in the reactor. Indeed, the longer the contact time between the solid particles and the chemical element(s) contained in the effluent, the greater the transfer of the elements from the liquid phase to the solid phase (the staying time must be at least 5 minutes in the reactor and at least 30 minutes in the settling tank in order to obtain satisfactory separation). Therefore, for a given effluent rate of flow, the volumes of the reactor and the settling tank must be adjusted in order to satisfy these staying times, bearing in mind that the greater the desired decontamination efficiency the larger must be the size of the reactor.

Moreover, a second treatment is sometimes required with the installations of the prior art, notably for complex effluents (containing several chemical elements to be eliminated), or those with high radiological activity. The consequence of this is to increase substantially, in the case of such effluents, the quantity of sludge produced. In order to prevent this it would be advantageous to be able to increase the treatment efficiency without increasing the volume of sludge produced.

One of the factors determining the efficiency of the treatment in terms of decontamination is the quantity of solid particles present in contact with the effluent to be decontaminated. To ensure a minimum degree of efficiency for the treatment, substantial quantities of reagents must be used. Since the radiological activity of a suspension may result from the presence of an infinitesimal quantity of radioelements (for example, several nanograms per liter), the sludge resulting from the treatment may then be weakly radioactive. It would, thus, be particularly advantageous to be able to concentrate the radiological activity in a smaller volume of sludge, in order to reduce the storage volumes.

Thus, there is a real requirement for a method of decontamination of a liquid element of one or more radioactive elements contained in it, enabling the following disadvantages to be overcome:

the problem of encumbrance of the installation on the ground, due to the need for the two operations required for the decontamination (treatment+solid-liquid separation);

the risks of contamination when the treated effluent and of the sludges formed in the solid-liquid separation unit are transferred, since this transfer occurs by means of pipes connecting the treatment unit to the decontamination unit;

the use of a large quantity of solids for a given volume of treated effluent for a decontamination which is sometimes low, and which leads to a large volume of waste, which must then be conditioned;

the need to be able to use organic compounds, such as flocculating agents, in order to accomplish the solid/liquid separation.

DESCRIPTION OF CERTAIN INVENTIVE ASPECTS

Thus, according to some aspects, a method for decontamination of a liquid effluent including one or more radioactive chemical elements to be eliminated is disclosed. The method includes the following steps:

a step of bringing into contact in a stirred fluidised bed, in a first zone of a reactor, of the said liquid effluent with solid particles able, by coprecipitation and/or adsorption and/or ion exchange, to capture and retain the said radioactive chemical element or elements, as a result of which a suspension of solid particles is obtained containing the said radioactive chemical element or elements;

a step of settling of the said suspension, in a second zone of the same reactor, where this second zone is separate from the first abovementioned zone, as a result of which a solid phase is obtained including the solid particles containing the said radioactive chemical element or elements to be eliminated, and a liquid phase with a reduced or zero content of the said radioactive chemical element or elements to be eliminated; and a step of separation of the said solid phase and of the said liquid phase.

This newly implemented method procures the following general advantages:

an efficient method in terms of investment, maintenance and operation, due to the use of a single reactor allowing the implementation of the contact, settling and separation operations;

a simple method of implementation, allowing the treatment of effluents at source, due to the ease with which the implementation reactor may be transported;

compared to a reactor not including a second compartment to facilitate settling, it is possible to work at a higher effluent rate of flow, and therefore, for an equal total volume of reactor, to treat a higher volume of effluent for a determined duration.

Furthermore, owing to the concomitant use of the fluidised bed system, of the stirring of the said bed and of a zone intended for settling, the method of the invention notably allows, in the absence of any bleeding, prolonged contact of the said solid particles with the effluent to be decontaminated, and therefore a high degree of decontamination efficiency. More specifically, the fact accomplishing the contact and settling in a single reactor allows an identical staying time for, simultaneously, this contact and this settling, unlike the traditional implementation, in which these two steps are accomplished in two different tanks. Since the staying time may be of the order of 30 minutes in the first zone, where the fluidised bed system is installed, the settling, within this period, can take place and the decontamination is improved by the extension of the contact time between the effluent and the solid particles, compared to a traditional implementation.

Advantageously, the method of the invention is a continuous method, which means, in other words, that the steps of this method are implemented concomitantly, i.e. that at a given time t, a volume of liquid effluent is in the course of the contact step, whereas another volume of liquid effluent is in the course of the settling step. Furthermore, with continuous operation, the first zone of the reactor is continuously supplied with liquid effluent for treating and with the abovementioned particles (or reagents able to form the said particles). This mode of operation thus enables variable volumes of effluent to be treated, without any limit being imposed by the volume of the reactor if the method is implemented discontinuously. This is particularly advantageous in that the additions of effluents in the treatment stations can vary over time. Working in this manner using a continuous mode of operation adds flexibility in the management of the decontamination operations.

In addition, as a consequence of the continuous supply of solid particles and effluent according to the continuous mode of operation, the size of the solid particles continuously increases, since the latter are able, notably when the stirring in the first zone is weak, to become consolidated in the form of compact clusters, leading to an increase of the average size of the particles in the device. This enables the contribution of organic compounds, which act as flocculating agents, to be omitted, or at the very least reduced.

This notably leads to an ease of recovery of the said particles by settling in the second zone, or by filtration after implementation of the method has been stopped.

In accordance with the invention, the method includes a step of bringing into contact in a stirred fluidised bed, in a first zone of a reactor, of the said liquid effluent with solid particles able, by coprecipitation and/or adsorption and/or ion exchange, to capture and retain the said radioactive chemical element or elements, as a result of which a suspension of solid particles is obtained containing the said radioactive chemical element or elements.

The said particles can be formed in situ by reaction between appropriate reagents in the said first zone, or injected preformed into the said first zone.

The said reactor used in this method is traditionally a vertical reactor, in which the first zone corresponds is a bed, which is a first column into which the liquid effluent together with the particles (or the reagents required for the formation of the said particles) are injected, where the injection may be made at several points of the bed, and may be made continuously, and the second zone is a second column positioned above the said first column, and traditionally having a diameter greater than that of the first column. The injection may be regulated, so as to concentrate the radiological activity in a predetermined volume of sludge.

Even if one advantage of the method of the invention is to avoid the use of a flocculating agent, at least one flocculating agent may be introduced, in this contact step, in the said first zone, i.e. an agent which will enable the solid matter (in this particular case, the abovementioned solid particles) to be carried away, such that they coagulate. It is possible to cite, as examples of flocculating agents, cationic, anionic or uncharged polymers, but preferentially anionic polymers. Let us cite, for example, BetzDearborn AP1110P, which is an anionic polymer of acrylamide of high molecular weight.

As mentioned above, the step of contact is accomplished in a fluidised bed.

It is stipulated that the term fluidised bed is traditionally understood to mean the fact of putting into suspension solid particles in a fluid upflow, where the said solid particles constitute the fluidised bed, and where these particles advantageously consist of the particles able to capture and retain the said radioactive element to be eliminated, whereas the fluid upflow advantageously consists of the liquid effluent to be decontaminated.

Use of a fluidised bed system notably results in an increase of the contact surface between the said particles and the effluent liquid to be treated, by this means allowing a satisfactory transfer of material to be accomplished between the said particles and the said liquid effluent, and thus a satisfactory degree of decontamination efficiency.

When the method is accomplished continuously it is advantageous to act such that the abovementioned solid particles have a staying time in the first zone higher than that of a given proportion of liquid effluent (for example of the order of one hour to several days for the solid particles, against one hour for the liquid effluent). This means that a large quantity of effluent will be able to be passed over a given quantity of solid particles. The result, compared to systems not using the fluidised bed system, is a reduction of the quantity of solid particles used per cubic meter of treated effluent.

If the total quantity of sludge produced by the method of the invention essentially derives from chemical reactions between the abovementioned solid particles and the radioactive chemical elements to be eliminated, it follows from the foregoing that there is a reduction of the total volume of sludge. The radiological activity of the sludge may thus be increased.

Advantageously, this first zone includes a stirrer blade, intended to ensure homogenisation of the bed, where this stirrer blade can take the form of a tree, on which paddles can be positioned at different heights.

If the method operates continuously and thus takes the form of a continuous supply of the first zone by the effluent to be treated and the abovementioned solid particles (or the reagents able to react to form the said particles), an increase of the quantity of solid particles in the reactor may occur, which may be detrimental for the satisfactory operation of the method. Thus, it may be important to include regulation over time of the quantity of solid particles in the said first zone. To accomplish this a step of bleeding of the said first zone may be included, whether continuous or discontinuous, so as to eliminate the surplus of solid particles detrimental to the satisfactory operation of the method.

The solid particles able to capture and retain the chemical element or elements to be extracted from the liquid effluent will be chosen so as to capture and retain the chemical element or elements in question. The radioactive chemical elements can be chosen from among strontium, ruthenium, caesium, the α emitters, such as americium, plutonium and uranium, and blends of the latter. In this case the method of decontamination of the invention will be a method for decontamination of radioactive liquid effluents originating, for example, from nuclear installations.

As examples, when the chemical element is strontium, the solid particles may be particles of barium sulphate, barium carbonate, calcium carbonate, iron hydroxide, calcium phosphate, iron phosphate, manganese dioxide, titanium dioxide, and preferably barium sulphate.

When the chemical element is ruthenium or an α emitter, such as americium, plutonium or uranium, the solid particles may be particles of iron or copper hydroxide.

When the chemical element is caesium, the solid particles may be particles of nickel or cobalt ferrocyanides, tetraphenylborate and/or more generally particles having a zeolitic structure. The solid particles able to capture and retain caesium are preferably particles of nickel or cobalt ferrocyanides.

When the contact step has been accomplished the method of the invention includes a step of settling of the said suspension, in a second zone of the same reactor, where this second zone is separate from the first abovementioned zone, as a result of which a solid phase is obtained including the solid particles containing the said radioactive chemical element or elements to be eliminated, and a liquid phase with a lower or zero content of the said radioactive chemical element or elements to be eliminated, and where the solid particle concentration may be very high (of the order of $100 \text{ kg/m}^3$ or higher). Thus, on conclusion of this step, a solid phase is obtained including the said particles in the lower part of the settling tank and a floating liquid phase with a low or zero content of the said radioactive chemical element or elements to be eliminated, and consequently of the said solid particle or particles.

From a practical standpoint, when the reactor is a vertical reactor, the second zone intended for the settling is generally positioned above the first zone in the form of a column, and this second zone generally has, compared to the first lower zone, a greater diameter than that of the lower column.

Lastly, the method of the invention includes a step of separation of the said solid phase and the said liquid phase, where the said liquid phase is traditionally separated from the solid phase by overflowing (for example, by means of one or more connection pieces positioned in the upper part of the second zone), whereas the solid phase is evacuated by drawing-off, generally in discontinuous fashion. This solid phase is treated, so as to condition it, in the form of bitumen or cement. As a consequence of the high concentration of solid particles in the second zone of the reactor, it may be possible to convey the solid phase from the second zone of the reactor to a conditioning step, without going through a step of dehydration by filtration. Indeed, in order to be conditioned, the solid phase must have a minimum density in order to allow it to be conveyed directly to the conditioning step, without any other intermediate treatment.

Prior to the implementation of the abovementioned steps (steps of contact, settling and separation), the method of the invention may advantageously include a step of filling of the first said zone with a predetermined quantity of solid particles able to capture and retain the said chemical elements to be eliminated and/or of reagents, as defined above.

The invention will now be described in terms of the following examples, given as illustrations and non-restrictively.

BRIEF DESCRIPTION OF THE DRAWINGS

Identical references have been used to designate identical or similar elements.

DETAILED DESCRIPTION OF CERTAIN ILLUSTRATIVE EMBODIMENTS

EXAMPLE 1

This comparative example illustrates the implementation of a traditional method in continuous mode for decontamination of a liquid effluent containing strontium.

Figure 1:
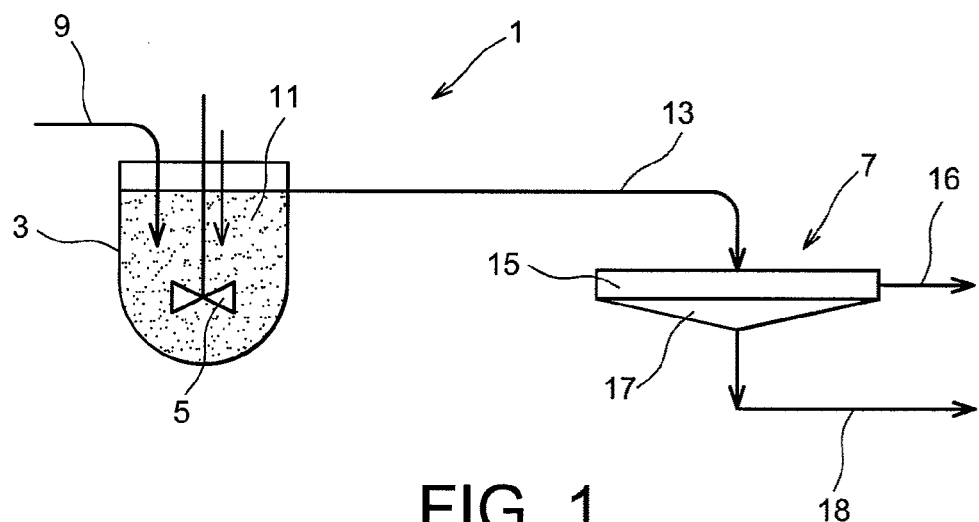
FIG. 1 represents, in the form of a schematic diagram, an example of an installation intended to allow implementation of a traditional method of decontamination of an aqueous effluent.

For the description of this example, reference should be made to FIG. 1, which represents, in the form of a schematic diagram, an example of an installation 1 designed for the implementation of the traditional method in continuous mode in the context of an industrial method for decontamination of an aqueous effluent, for example originating from the reprocessing of an irradiated nuclear fuel, including strontium.

Installation 1 includes respectively:
a first reactor 3, intended to receive the aqueous effluent to be decontaminated and the solid particles (or the reagents able to react to form the appropriate particles), able to capture and retain the strontium contained in the liquid effluent, where this first reactor takes the form of a glass reactor with a useful volume of 2.5 liters; where the first reactor 3 is fitted with a stirrer device 5 and with metal baffles and an overflow system (not represented), intended to evacuate any overflow, if applicable;
where a second reactor 7 fulfils the function of a settling tank intended to receive the suspension formed in the first reactor, where this suspension includes the solid particles having chelated the strontium, and where this second reactor is a reactor of the cylindrical-conical type having a useful volume of 13 liters, and where the suspension is supplied at its centre;
a first pipe 9 connected to the first reactor 3 which supplies the latter with aqueous effluent including the strontium element to be eliminated, and where conveyance is facilitated by means of a peristaltic pump (not represented);
a second pipe 11 connected to the first reactor 3 which supplies the latter with reagents able to react to form solid particles able to capture and retain the strontium and/or with previously formed solid particles (where these particles are in this instance solid barium sulphate particles), and where conveyance is facilitated by means of a peristaltic pump (not represented);
a third pipe 13, which connects the first reactor 3 to the second reactor 7, and which conveys, in the form of an overflow flow, the suspension including the solid particles having captured and retained the strontium from the first reactor to the second reactor;
a fourth pipe 16 which allows the drawing-off of the decontaminated liquid phase 15;
a fifth pipe 18 which allows the drawing-off of the solid phase 17.

In the device presented above, the effluent introduced into the reactor 3 by the pipe 9 consists of 42.5 g/L of sodium nitrate, 14.2 g/L of sodium sulphate and 23 mg/L of strontium nitrate. The element to be eliminated is strontium. The effluent rate of flow in pipe 9 is adjusted to 14 L/h. The reagent introduced through pipe 11 is a solution of barium nitrate at 76 g/L and the rate of flow in pipe 11 is 1 L/h.

The sulphate ions introduced through pipe 9 will react with the barium ions introduced through the pipe 11 to form solid particles of barium sulphate which will capture and retain the strontium.

After 40 minutes' operation, the average size of the $BaSO_4$ particles produced is between $1*10^{-6}$ and $2*10^{-6}$ m. In addition, the residual strontium concentration measured at the output of the reactor 3 by the pipe 13 is equal to $200\pm4*10^{-6}$ g/L. The quantity of solid particles in reactor 3 is measured by filtering with a filter having a grading threshold of $0.22*10^{-6}$ m, a determined volume of a suspension extracted from reactor 3. The solid collected in the filter is placed in the kiln at 110° C. for 24 hours and then weighed. On conclusion of this procedure, the quantity of solid particles present in the reactor 3 is equal to 4.5 kg/m³.

EXAMPLE 2

In the device described in example 1, an effluent containing strontium nitrate $Sr(NO_3)_2$ at a concentration of $24*10^{-3}$ g/L, neodymium nitrate $Nd(NO_3)_3 \cdot 6H_2O$ at a concentration of $61*10^{-3}$ g/L and caesium nitrate at a concentration of $30*10^{-3}$ g/L is introduced into reactor 3. This effluent also contains 42.5 g/L of sodium nitrate $NaNO_3$ and 5.35 g/L of sodium sulphate $Na_2SO_4$. The elements to be eliminated are strontium, caesium and neodymium.

The effluent is injected at a constant rate of flow of 15 L/h through pipe 9. In this example, pipe 11 corresponds, in reality in this example, to 4 pipes conveying the following 4 solutions or suspensions:
a solution including 92.5 g/L of barium nitrate $Ba(NO_3)_2$ at a constant rate of flow of 0.84 L/h;
a solution including 178.6 g/L of iron sulphate $FeSO_4 \cdot 7H_2O$ and 35.7 g/L of copper sulphate $CuSO_4 \cdot 5H_2O$ at a constant rate of flow of 0.57 L/h;
a solution including 720 g/L of sodium hydroxide NaOH at a constant rate of flow of 0.06 L/h;
a suspension formed by a blend of 43 g/L of potassium ferrocyanide $Fe(CN)_6K_4 \cdot 3H_2O$ and 28.6 g/L of nickel sulphate $NiSO_4 \cdot 6H_2O$ introduced at a constant rate of flow of 0.57 L/h.

After 1 hour 30 minutes of operation, the residual concentrations of strontium, caesium and neodymium in pipe 16 after filtration at 0.22 µm are as follows:
strontium: $280*10^{-6}$ g/L;
caesium: less than $40*10^{-6}$ g/L;
neodymium: less than $130*10^{-6}$ g/L.

EXAMPLE 3

This example illustrates the implementation of the traditional method in discontinuous mode for decontamination of a liquid effluent containing strontium.

Figure 2:
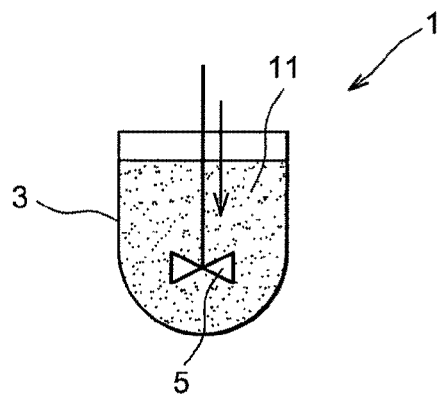
FIG. 2 represents, in the form of a schematic diagram, an example of an installation intended to allow implementation of another traditional method of decontamination of an aqueous effluent.

For the description of this example, reference should be made to FIG. 2 which represents, in the form of a schematic diagram, an example of an installation 1 designed for the implementation of the traditional method in discontinuous mode in the context of an industrial method for decontamination of an aqueous effluent, for example originating from the reprocessing of an irradiated nuclear fuel, including strontium.

The installation shown in FIG. 2 includes respectively:
a reactor 3, intended to receive the aqueous effluent to be decontaminated and the solid particles (or the reagents able to react to form the appropriate particles), able to capture and retain the strontium contained in the liquid effluent, where this first reactor takes the form of a glass reactor with a useful volume of 2.5 liters; where reactor 3 is fitted with a stirrer device 5 and metal baffles (not represented);
a pipe 11 connected to reactor 3 which supplies the latter with reagents able to react to form solid particles able to capture and retain the strontium and/or with previously formed solid particles (where these particles are in this instance solid barium sulphate particles), and where conveyance is facilitated by means of a peristaltic pump (not represented).

In the device presented above the reactor initially contains 2.3 L of a solution consisting of 42.5 g/L of sodium nitrate, 14.2 g/L of sodium sulphate and 23 mg/L of strontium nitrate. The element to be eliminated in this solution is strontium. The reagent introduced through pipe 11 is a solution of barium nitrate at 76 g/L and the rate of flow in pipe 11 is 1 L/h. The supply through pipe 11 continues for 10 minutes and is then stopped. No introduction or draw-off is subsequently accomplished, and stirring continues in the reactor.

After 2 hours' stirring, the average size of the $BaSO_4$ particles produced is between $1*10^{-6}$ and $2*10^{-6}$ m. In addition, the residual concentration of strontium measured in the liquid phase obtained after filtration at 0.22 μm is equal to $125\pm25*10^{-6}$ g/L. The density of $BaSO_4$ in the reactor is equal to 4.5 kg/m³.

EXAMPLE 4

This example illustrates the implementation of the method of the invention for decontamination of a liquid effluent including strontium.

In the context of examples 4 to 6, the installation 20 includes a reactor including respectively:

- a first zone 22, intended to receive the aqueous effluent to be decontaminated and the solid particles (or the reagents able to react to form the appropriate particles) able to capture and retain the radioactive element to be eliminated, where this first zone takes the form of a glass column 10 cm in diameter and 50 cm in height, with a useful volume of 4 liters; where this first zone is fitted with a stirrer device 24 including 4 stages of paddles each measuring 3 cm in width and 1.5 cm in height, connected to a motor (not represented), by this means causing the device to rotate at a speed of the order of 30 revolutions per minute;
- a second zone 26, providing the settling tank function intended to receive the suspension formed in the said first zone, where this suspension includes the solid particles having chelated the radioactive element to be eliminated, and where this second zone takes the form of a plexiglass column 20 cm in diameter and 30 cm in height, having a useful volume of 8.5 liters;
- a first pipe 28 connected to the first zone 5 which supplies the latter with aqueous effluent including the radioactive element to be eliminated, and where conveyance is facilitated by means of a peristaltic pump (not represented);
- a second pipe 30 connected to the first zone 5 which supplies the latter with reagents able to react to form particles able to capture and retain the radioactive element to be eliminated and/or with previously formed solid particles and possibly with flocculating agent, where these reagents and/or particles originate from a tank including the said reagents and/or the said particles (this tank is not represented), and where conveyance is facilitated by means of a peristaltic pump (not represented);
- a third pipe 32 which allows the drawing-off, by overflowing, of the decontaminated liquid phase 34;
- a fourth pipe 36 which allows the drawing-off of the solid phase 38;
- a fifth pipe 40 which allows the first zone to be bled, if applicable.

The liquid effluent to be decontaminated contains strontium nitrate $Sr(NO_3)_2$ at a concentration of 23 mg/L. This effluent also contains 42.5 g/L of sodium nitrate $NaNO_3$ and 14.2 g/L of sodium sulphate $Na_2SO_4$. The element to be eliminated is strontium.

In the example, the effluent is injected at a constant rate of flow of 10.1 L/h through pipe 28. Through pipe 30, a solution containing 76 g/L of barium nitrate $Ba(NO_3)_2$ is injected at a constant rate of flow of 0.37 L/h at approximately 0.05 m from the base of the device. The blending of the effluent and of the barium nitrate solution causes the formation of barium sulphate $BaSO_4$. The device is initially filled with a suspension of barium sulphate at a concentration of approximately 130 kg/m³. After 48 hours' operation, a sample is taken through pipe 32 and filtered at 0.22 μm to measure by ICP-MS the residual strontium concentration. The measured residual strontium concentration is less than the measuring device's detection limit, i.e. less than $20\pm4*10^{-6}$ g/L. This residual concentration is lower than that obtained with a traditional embodiment in continuous mode with the same effluent and the same rate of flow of barium solution, which is only $200\pm4*10^{-6}$ g/L (in accordance with example 1). In a traditional implementation in discontinuous mode using the same quantity of $BaSO_4$, the strontium concentration is $125\pm25*10^{-6}$ g/L (in accordance with example 3). In conclusion, there is at minimum a factor 6 between the efficiency of the treatment in a fluidised bed and that of the traditional implementations.

In addition, the quantity of $BaSO_4$ produced per unit volume of effluent treated in the fluidised bed in the context of this example is half that produced in treatments undertaken at an industrial scale in the effluent treatment installations of Marcoule CEA. This example therefore shows the excellent efficiency of the method for treating effluents containing strontium, and also shows the potentials for reducing the volumes of waste generated by the method.

EXAMPLE 5

In order to show the increase of size of the particles produced by the device described in example 4, a series of experiments was undertaken for different rates of flow of barium nitrate solution in pipe 30, retaining the rate of flow and the characteristics of the effluent of example 1. Thus, 4 experiments were undertaken for rates of flow in pipe 30 of 0.7 L/h, 0.42 L/h, 0.14 L/h and 0.097 L/h. The sizes of the corresponding particles were measured after at least 48 hours' operation in each case using a laser granulometer (Malvern Mastersizer 2000). Sizes of between $13*10^{-6}$ m and $23*10^{-6}$ m were obtained. As a comparison, a maximum size of $2*10^{-6}$ m is obtained with the traditional devices operating in continuous and discontinuous mode (in accordance with examples 1 and 3). The outcome of these results is that the filterability of the particles produced in the fluidised bed is facilitated compared to the particles produced in the traditional treatments.

Furthermore, the quantity of solid particles in compartment 22 is measured by filtering, with a filter having a grading threshold of $0.22*10^{-6}$ m, a determined volume of a suspension extracted from compartment 22. The solid collected in the filter is placed in the kiln at 110° C. for 24 hours and then weighed. On conclusion of this procedure, the quantity of solid particles present in compartment 22 for each of the experiments is between 130 and 160 kg/m³. This is considerably higher than the traditional implementations, in which the quantity of solid particles does not exceed 15 kg/m³ (in accordance with examples 1 and 3).

EXAMPLE 6

Figure 3:
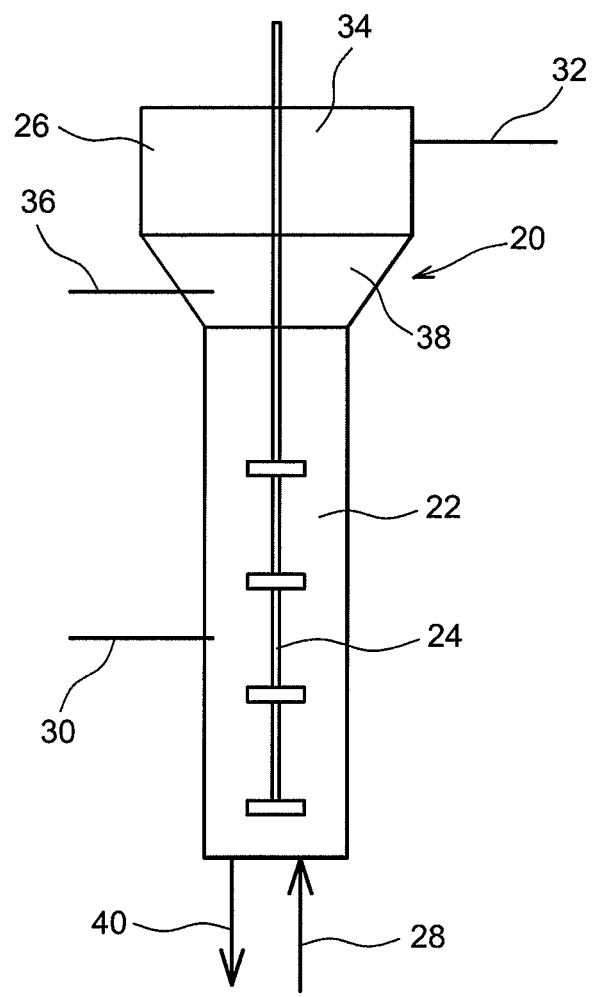
FIG. 3 represents, in the form of a schematic diagram, an example of an installation intended to allow implementation of the method of the invention.

In this example, the device is different from that used in examples 4 and 5 but still matches the schematic diagram of FIG. 3. The first zone 22 measures 0.15 m in diameter and 0.18 m in height, representing a useful volume of 2.9 L. The stirrer blade consists of 2 stages of paddles. The paddles located at the lower end of the blade measure 0.06 m in width and 0.04 m in height, whereas those of the upper stage measure 0.06 m in width and 0.015 m in height. The first zone 22 is also fitted with 4 metal baffles 0.01 m in width all along the top of the first zone 22, allowing blending of the effluent with the reagents to be favoured. The blade's speed of rotation is 75 rpm. The second zone 26 measures 0.45 m in diameter and 0.16 m in height, corresponding to a useful volume of 15.7 L.

In this device, an effluent is introduced at approximately 0.05 m from the lower part of the device containing strontium nitrate $Sr(NO_3)_2$ at a concentration of $24*10^{-3}$ g/L, neodymium nitrate $Nd(NO_3)_3 \cdot 6H_2O$ at a concentration of $61*10^{-3}$ g/L and caesium nitrate at a concentration of $30*10^{-3}$ g/L. This effluent also contains 42.5 g/L of sodium nitrate $NaNO_3$ and 5.35 g/L of sodium sulphate $Na_2SO_4$. The elements to be eliminated are strontium, caesium and neodymium.

The effluent is injected at a constant rate of flow of 15 L/h through pipe 28. In this example, pipe 30 corresponds, in reality in this example, to 4 pipes conveying to 0.05 m of the base of the device the following 4 solutions or suspensions:
- a solution including 92.5 g/L of barium nitrate $Ba(NO_3)_2$ at a constant rate of flow of 0.84 L/h;
- a solution including 178.6 g/L of iron sulphate $FeSO_4 \cdot 7H_2O$ and 35.7 g/L of copper sulphate $CuSO_4 \cdot 5H_2O$ at a constant rate of flow of 0.57 L/h;
- a solution including 720 g/L of sodium hydroxide NaOH at a constant rate of flow of 0.06 L/h;
- a suspension formed by a blend of 43 g/L of potassium ferrocyanide $Fe(CN)_6K_4 \cdot 3H_2O$ and 28.6 g/L of nickel sulphate $NiSO_4 \cdot 6H_2O$ introduced at a constant rate of flow of 0.57 L/h.

The experiment starts with the filling of the device with the effluent through pipe 28 and with the 4 contributions of pipe 30. After 4 hours' operation, the residual concentrations of strontium, caesium and neodymium in pipe 32 after filtration at 0.22 µm are as follows:
- strontium: $25*10^{-6}$ g/L;
- caesium: less than $20*10$ g/L;
- neodymium: less than $20*10^{-6}$ g/L.

As a comparison, with the traditional embodiment in continuous mode, all rates of flow being equal (in accordance with example 2), the residual concentrations of strontium, caesium and neodymium are as follows:
- strontium: $280*10^{-6}$ g/L;
- caesium: less than $40*10^{-6}$ g/L;
- neodymium: $130*10^{-6}$ g/L;

The comparison of the traditional continuous method and the method using a fluidised bed shows that, for a given quantity of sludge produced, decontamination is improved by a factor 11 for strontium, and by a minimum factor of 6.5 for neodymium.

The invention claimed is:

1. A method for decontaminating liquid effluent comprising at least one radioactive chemical element to be removed, the method comprising:
    producing in situ, by reaction between appropriate reagents, in a first zone of a reactor, solid particles configured to capture and retain the at least one radioactive chemical element by at least one of coprecipitation, adsorption and ion exchange;
    bringing into contact in a stirred fluidized bed, in the first zone of the reactor, the liquid effluent with the solid particles, whereby the solid particles are put into suspension into a fluid upflow constituted by the liquid effluent and capture and retain the at least one radioactive chemical element by at least one of coprecipitation, adsorption and ion exchange;
    settling the solid particles having captured and retained the at least one radioactive chemical element, in a second zone of the same reactor, wherein the second zone is separate from the first zone;
    obtaining a solid phase including the solid particles containing the at least one radioactive chemical element and a liquid phase with a reduced content of the at least one radioactive chemical element; and
    separating the solid phase and the liquid phase.

2. A method according to claim 1, wherein the at least one radioactive chemical element is continuously removed from the liquid effluent.

3. A method according to claim 1, wherein the at least one radioactive chemical element is chosen from among the group consisting of strontium, ruthenium, cesium, α emitters, and mixtures thereof.

4. A method according to claim 3, wherein, when the at least one chemical element to be removed is strontium, the solid particles comprise solid particles selected from the group consisting of barium sulphate, barium carbonate, calcium carbonate, iron hydroxide, calcium phosphate, iron phosphate, manganese dioxide and titanium dioxide.

5. A method according to claim 3, wherein, when the at least one chemical element is ruthenium or an α emitter, the solid particles comprise iron or copper hydroxide.

6. A method according to claim 3, wherein, when the chemical element to be removed comprises cesium, the solid particles are selected from the group consisting of nickel and cobalt ferrocyanide, tetraphenylborate, and particles with a zeolitic structure.

7. A method according to claim 1, wherein the reactor is a vertical reactor, wherein the first zone is a first column and the second zone is a second column positioned above the first column; and wherein the second zone has a diameter greater than that of the first column.

8. A method according to claim 1, wherein the fluidized bed is stirred by means of a stirrer blade present in the first zone.

9. A method according to claim 1 further comprising introducing of a flocculant agent into the first zone.

10. A method according to claim 1 further comprising, filling the first zone with a predetermined quantity of solid particles able to capture and retain the at least one chemical element and/or of reagents able to react to form the solid particles prior to bringing the liquid effluent into contact with the solid particles.

11. A method according to claim 1, wherein the liquid phase does not include any of the at least one radioactive chemical element.

12. A method according to claim 3, wherein the α emitters are selected from the group consisting of americium, plutonium, and uranium.

* * * * *